(12) United States Patent
Christensen et al.

(10) Patent No.: US 9,196,933 B2
(45) Date of Patent: Nov. 24, 2015

(54) SYSTEM AND METHOD FOR DISCHARGING A HIGH IMPEDANCE BATTERY

(75) Inventors: John F. Christensen, Mountain View, CA (US); Martin Koenigsmann, Stuttgart (DE); Jens Grimminger, Gerlingen (DE); Jörg Ziegler, Rutesheim (DE); Bernd Schumann, Rutesheim (DE); Reinhardt Klein, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 897 days.

(21) Appl. No.: 13/151,740

(22) Filed: Jun. 2, 2011

(65) Prior Publication Data

US 2012/0306452 A1 Dec. 6, 2012

(51) Int. Cl.
*H02J 7/00* (2006.01)
*H01M 10/44* (2006.01)
*H01M 10/48* (2006.01)

(52) U.S. Cl.
CPC .......... *H01M 10/443* (2013.01); *H01M 10/441* (2013.01); *H01M 10/482* (2013.01); *H01M 10/486* (2013.01); *H01M 10/44* (2013.01)

(58) Field of Classification Search
CPC ... H02J 7/0031; Y02E 60/12; G01R 31/3648; H01M 10/443; H01M 10/482; H01M 10/486; H01M 10/488
USPC .......................................... 320/134, 136, 135
See application file for complete search history.

(56) References Cited

U.S. PATENT DOCUMENTS

| | | | |
|---|---|---|---|
| 5,362,942 A | 11/1994 | Vanderslice, Jr. et al. | |
| 5,488,282 A | 1/1996 | Hayden et al. | |
| 6,054,842 A | 4/2000 | Verzwyvelt et al. | |
| 7,525,285 B2 * | 4/2009 | Plett | 320/132 |
| 7,570,021 B2 * | 8/2009 | Togashi et al. | 320/130 |
| 7,573,238 B2 * | 8/2009 | Kawai | 320/132 |
| 7,598,706 B2 | 10/2009 | Koski et al. | |
| 7,646,176 B2 * | 1/2010 | Yamamoto | 320/150 |
| 7,676,334 B2 | 3/2010 | Matsuura et al. | |
| 7,688,033 B2 * | 3/2010 | Minamiura | 320/134 |
| 2007/0126404 A1 * | 6/2007 | Iida et al. | 320/136 |
| 2008/0180061 A1 | 7/2008 | Koski et al. | |
| 2009/0039835 A1 * | 2/2009 | Wolf et al. | 320/136 |

(Continued)

FOREIGN PATENT DOCUMENTS

JP 2002325369 A 11/2002

OTHER PUBLICATIONS

Benini et al., "Discharge Current Steering for Battery Lifetime Optimization," International Symposium on Low Power Electronics and Design, Aug. 12-14, 2002, pp. 118-123, Monterey, California, USA (6 pages).

(Continued)

*Primary Examiner* — Richard Isla Rodas
*Assistant Examiner* — Michael Dibenedetto
(74) *Attorney, Agent, or Firm* — Maginot & Beck LLP (57) ABSTRACT

An electrochemical battery system in one embodiment includes a first electrochemical cell, a memory in which command instructions are stored, and a processor configured to execute the command instructions during a discharge cycle of the first electrochemical cell to (i) establish a first discharge voltage of the first electrochemical cell based upon a first sensed discharge voltage, and (ii) permit a second discharge voltage of the first electrochemical cell after establishing the first discharge voltage, wherein the second discharge voltage is greater than the first discharge voltage.

18 Claims, 7 Drawing Sheets

(56) References Cited

U.S. PATENT DOCUMENTS

| | | |
|---|---|---|
| 2010/0079111 A1 | 4/2010 | Masuda |
| 2010/0250038 A1* | 9/2010 | Morita et al. ............... 701/22 |
| 2010/0283430 A1* | 11/2010 | Chaturvedi et al. ......... 320/134 |
| 2011/0148363 A1* | 6/2011 | Frisch et al. ................. 320/162 |

OTHER PUBLICATIONS

International Search Report and Written Opinion in corresponding PCT Application (i.e., PCT/US2012/040426), mailed Aug. 21, 2012 (10 pages).

* cited by examiner

SYSTEM AND METHOD FOR DISCHARGING A HIGH IMPEDANCE BATTERY

FIELD OF THE INVENTION

This invention relates to batteries and more particularly to batteries exhibiting a high impedance.

BACKGROUND

Batteries are a useful source of stored energy that can be incorporated into a number of systems. As batteries age, however, they tend to develop high internal resistance that increases with time. In some cases, the internal resistance in a particular cell can become high enough that high constant current to or from the cell results in nonmonotonic charge or discharge voltage evolution.

Figure 1:
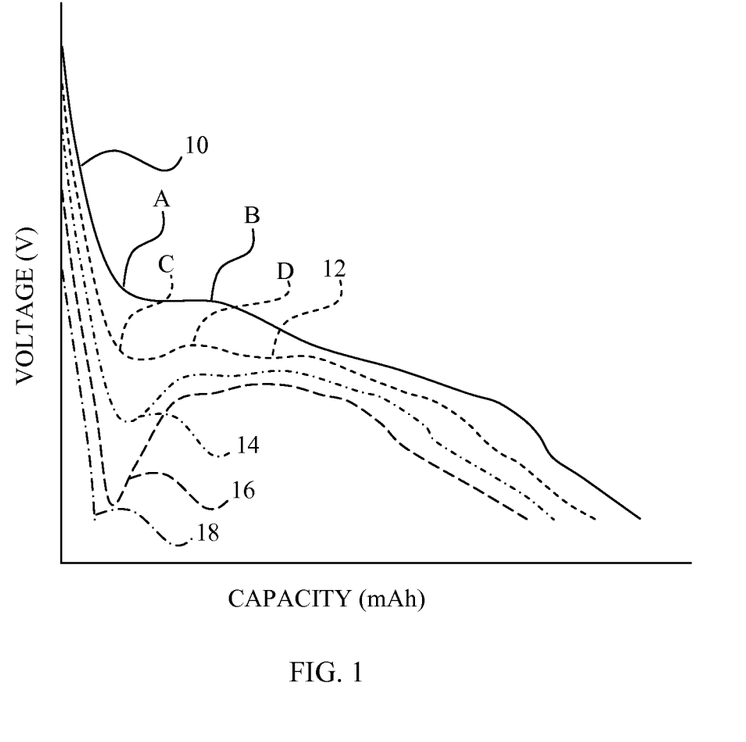
FIG. 1 depicts the voltage profiles of a typical electrochemical cell over the cell life revealing a decreased capacity over cell life as well as a nonmonotonic discharge profile later in cell life.

By way of example, FIG. 1 depicts the simulated discharge voltage profiles for an electrochemical cell for discharge cycles at various stages of the electrochemical cell life. Voltage profile 10 depicts the voltage of an electrochemical cell as the cell is discharged at a time early in the cell life. The voltage profile 10 includes an initial rapid decrease in voltage to about reference point A followed by substantially constant voltage until about reference point B. After Reference point B, the voltage profile 10 exhibits a relatively steady decrease in voltage through the end of the discharge cycle.

Voltage profile 12 depicts the voltage of an electrochemical cell as the cell is discharged at a time later in cell life than the cell life associated with the voltage profile 10. The discharge cycle depicted by the voltage profile 12 begins at a slightly lower voltage compared to the initial voltage of the voltage profile 10 but also exhibits an initial rapid decrease in voltage to about reference point C followed by a slight increase in voltage until about reference point D. The initial decrease in voltage depicted by the voltage profile 12 is more pronounced than the initial decrease in voltage depicted by the voltage profile 10. The increase in voltage between reference point C and D is also different from the substantially constant voltage between the reference points A and B. The voltage profile 12 at all times, however, is lower than the voltage profile 10.

As the age of the electrochemical cell continues to increase as depicted by the voltage profiles 14 and 16, the pattern established by the voltage profiles 10 and 12 continues, with each successive voltage profile (i) beginning at a lower voltage than the earlier voltage profile, (ii) exhibiting a deeper initial drop in voltage, (iii) exhibiting a more significant increase in voltage after the initial voltage drop, and (iv) remaining below the earlier voltage profiles.

The foregoing pattern continues until the age of the electrochemical cell depicted by the voltage profile 18. The initial voltage of the voltage profile 18 along with the initial drop in voltage is such that the electrochemical cell reaches a minimum voltage at which point the discharge cycle of the electrochemical cell is terminated. In some embodiments, this minimum voltage is detected by a battery system and the electrochemical cell is open circuited to prevent cell reversal.

The successively decreasing initial voltage of the voltage profiles 10-18 is a function of the capacity loss of the electrochemical cell. The initial drop in voltage, along with the ensuing rebound, is a function of the internal resistance (in particular the electrolyte impedance) of the electrochemical cell and is described with reference to FIGS. 2-4.

Figure 2:
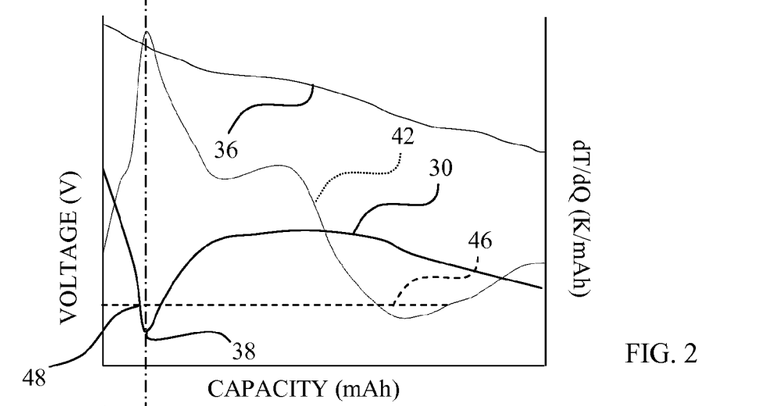
FIG. 2 depicts the open cell voltage profile and discharge voltage profile of a typical electrochemical cell during a discharge cycle while maintaining a constant discharge rate showing a rapid decrease in discharge voltage followed by a rapid increase in discharge voltage and then a gradual decay of the discharge voltage. The rate at which the electrochemical cell increases in temperature during discharge is also depicted.
Figure 3:
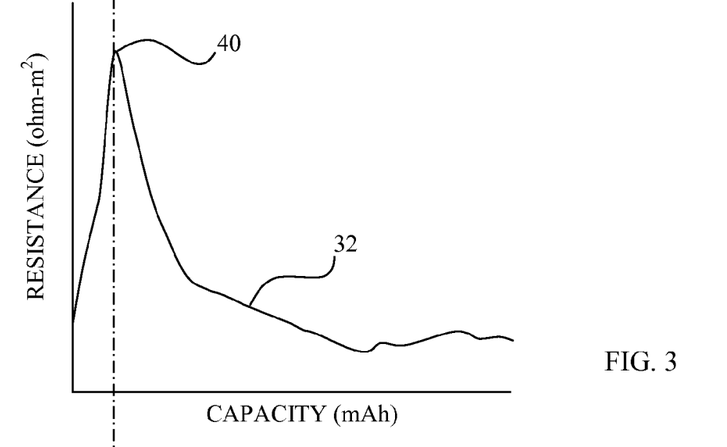
FIG. 3 depicts an internal resistance profile of the electrochemical cell discussed above during the discharge cycle depicted in FIG. 2.
Figure 4:
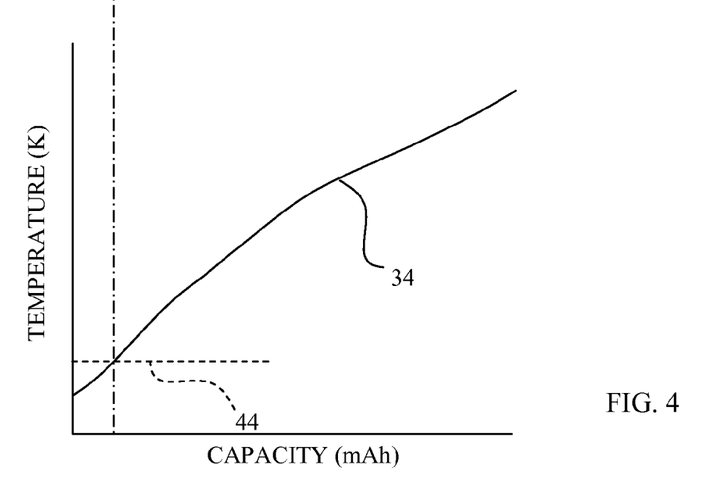
FIG. 4 depicts a temperature profile of the electrochemical cell discussed above along with a threshold temperature above which the internal resistance as depicted in FIG. 3 begins to decrease during the discharge cycle depicted in FIG. 2.

FIGS. 2-4 depict a voltage profile 30, an internal resistance profile 32, and a temperature profile 34, respectively, of a cell during a discharge cycle with a constant discharge current. The open cell voltage 36 of the electrochemical cell is also depicted in FIG. 2. The difference in voltage between the open cell voltage 36 and the voltage profile 30 corresponds to the voltage drop resulting from the internal resistance of the cell.

The power dissipated by the electrochemical cell due to internal resistance is a significant contributor to the temperature of the cell. The rate of the temperature increase of the cell is thus a function of the power dissipated by the electrochemical cell and the power dissipation is a product of the current and the voltage drop resulting from the internal resistance of the cell. Since the current in the discharge cycle of FIGS. 2-4 is being maintained constant, the voltage difference between the open cell voltage 36 and the voltage profile 30 is the primary reason for changes in the rate of temperature increase. Thus, the slope of the temperature profile 34 which is depicted in FIG. 2 by a slope profile 42 tracks with the difference between the open cell voltage 36 and the voltage profile 30.

FIGS. 2-4 thus show that as operation of an electrochemical cell is initiated, the discharge voltage of the electrochemical cell instantaneously drops from the open cell potential 36 to the discharge voltage profile 30 with the amount of voltage drop a function of the internal resistance of the cell. As the electrochemical cell is discharged, FIG. 4 shows that the temperature of the cell increases as indicated by the temperature profile 34. Additionally, the internal resistance of the electrochemical cell increases rapidly as indicated by the internal resistance profile 32 of FIG. 3.

The increasing internal resistance drives the discharge voltage downward toward a minimum discharge voltage 38. The minimum discharge voltage 38 of the voltage profile 30 corresponds with the maximum internal resistance 40 of the internal resistance profile 32.

Once the temperature of the cell increases above a threshold temperature 44 of the temperature profile 34, the internal resistance of the electrochemical cell begins to decrease (see internal resistance profile 32 to the right of point 40 in FIG. 3). The reduced internal resistance is manifested as an increased voltage as shown by the voltage profile 30. The increased voltage profile 30 reduces the difference between the voltage profile 30 and the open cell voltage 36 thereby reducing the rate at which the temperature of the cell is increasing. The increased voltage displayed by the discharge voltage profile 30 indicates that the cell voltage is nonmonotonic.

So long as the minimum discharge voltage 38 of a particular cell is sufficiently high, substantially all of the capacity of the electrochemical cell can be discharged even with a nonmonotonic discharge profile. As the cell ages, however, the minimum discharge voltage 38 becomes lower (see, e.g., voltage profiles 12, 14, and 16 of FIG. 1). Thus, if the electrochemical cell has a minimum allowed discharge voltage 46 (see FIG. 2), then when the discharge voltage reaches the minimum allowed discharge voltage 46 at point 48, discharge of the electrochemical cell is terminated. Thus, all of the capacity to the right of the point 48 of FIG. 2 and under the voltage profile 30, even though stored within the cell, cannot be used.

What is needed therefore is a battery system and method that provides increased access to electrochemical cell capacity.

SUMMARY

An electrochemical battery system in one embodiment includes a first electrochemical cell, a memory in which command instructions are stored, and a processor configured to execute the command instructions during a discharge cycle of the first electrochemical cell to (i) establish a first discharge voltage of the first electrochemical cell based upon a first sensed discharge voltage, and (ii) permit a second discharge voltage of the first electrochemical cell after establishing the first discharge voltage, wherein the second discharge voltage is greater than the first discharge voltage.

In accordance with another embodiment, an electrochemical battery system includes an electrochemical cell, and a voltage limiting circuit, wherein the voltage limiting circuit is configured to (i) establish a first maintained discharge voltage of the electrochemical cell based upon a first unconstrained discharge voltage of the electrochemical cell, and (ii) permit a second unconstrained discharge voltage of the electrochemical cell after establishing the first maintained discharge voltage, wherein the second unconstrained discharge voltage is greater than the first maintained discharge voltage.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 5:
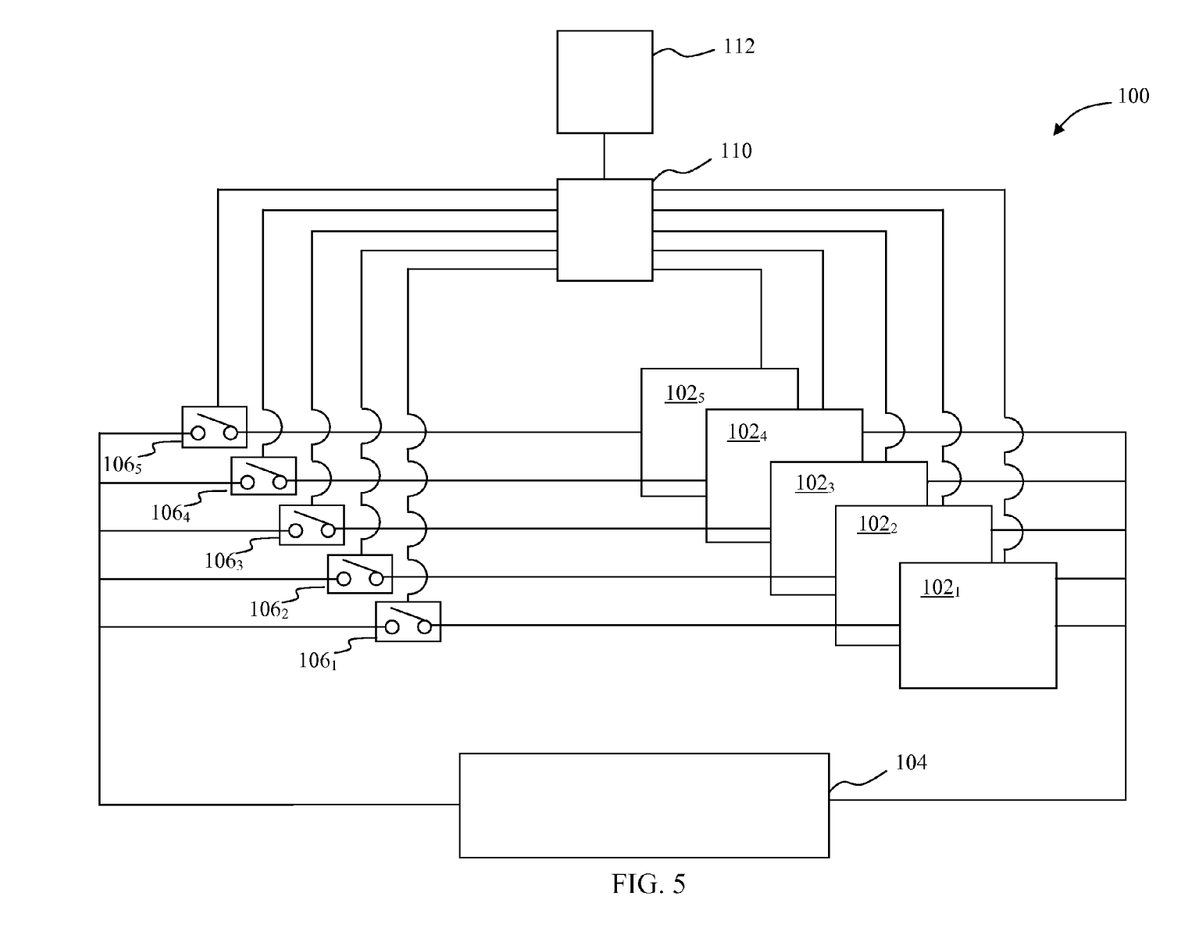
FIG. 5 depicts a simplified schematic of a battery system including several electrochemical cell modules which can be independently controlled for charging or discharging operations.

FIG. 5 depicts a battery system 100 including several lithium-ion battery cell modules $102_x$. In the embodiment of FIG. 5, five battery cell modules $102_{1-5}$ are depicted. In alternative embodiments, more or fewer battery cell modules of different or the same chemistry may be provided. Each of the lithium-ion battery cell modules $102_x$ is selectively connected to a load or voltage source 104 through a respective switch $106_x$. Each of the switches $106_x$ are controlled by a processor 110 which is operably connected to a memory 112. Various command instructions, discussed in further detail below, are programmed into the memory 112. The processor 110 is operable to execute the command instructions programmed into the memory 112.

Figure 6:
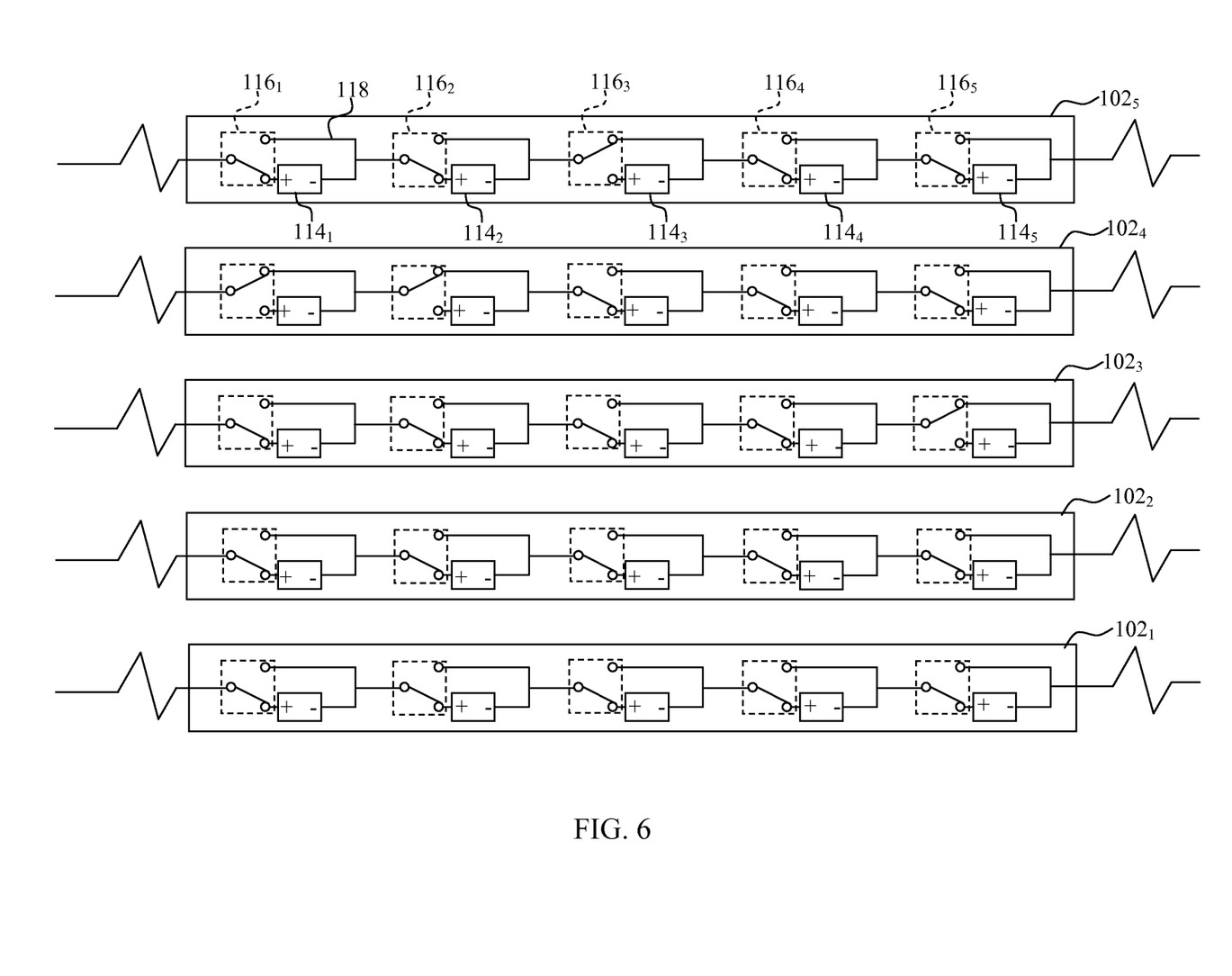
FIG. 6 depicts a simplified schematic of the cell modules of FIG. 5 showing the independently controlled connection switches for each of the electrochemical cells within the electrochemical cell modules.

The lithium-ion battery cell modules $102_x$ in this embodiment are identical and are described in further detail with reference to FIG. 6 and the lithium-ion battery cell module $102_5$. The lithium-ion battery cell module $102_5$ includes five lithium-ion battery cells $114_{1-5}$. A two-way connection switch $116_{1-5}$ is associated with each of the battery cells $114_{1-5}$. The connection switches $116_{1-5}$, which are independently controlled by the processor 110 (control lines are omitted for clarity), can alternatively connect the respective battery cells $114_{1-5}$ to an internal battery cell circuit 118 or bypass the respective battery cell $114_{1-5}$. In FIG. 6, the connection switches $116_{1, 2, 4, and 5}$ are positioned to connect the respective battery cells $114_{1, 2, 4, and 5}$ to the battery cell circuit 118 while the connection switch $116_3$ is positioned to a bypass position whereby the respective battery cell $114_3$ is effectively electrically isolated from the battery cell circuit 118.

Figure 7:
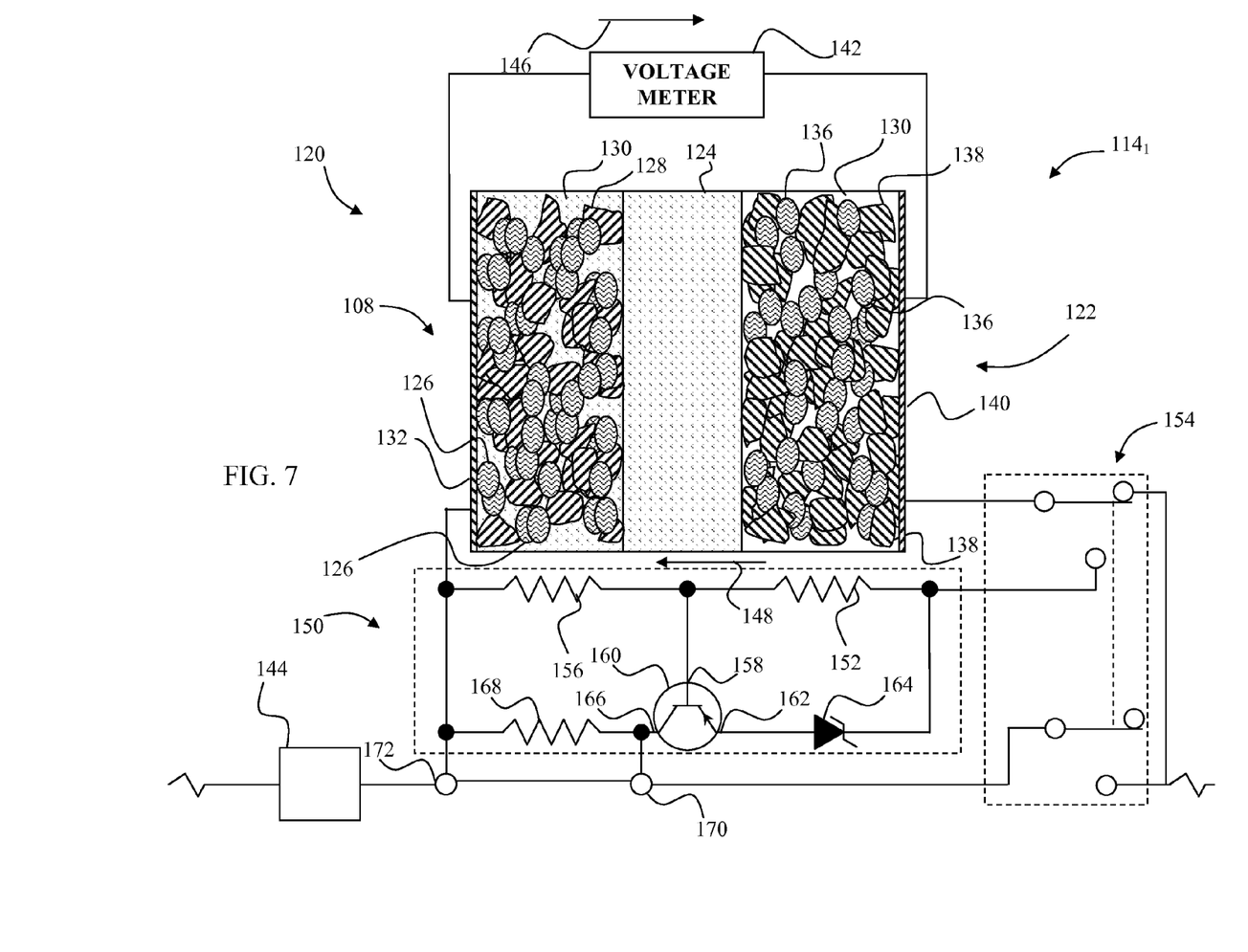
FIG. 7 depicts a schematic of one of the electrochemical cells of FIG. 6 showing an amp meter and a voltage meter which can be used in executing a charging and discharging strategy along with a voltage limiting circuit that can be switched inot the electrochemical cell circuit.

The lithium-ion battery cells $114_{1-5}$ in this embodiment are identical and are described in further detail with reference to the lithium-ion battery cell $114_1$ shown in FIG. 7. The lithium ion cell $114_1$ includes a negative electrode 120, a positive electrode 122, and a separator region 124 between the negative electrode 120 and the positive electrode 122. The negative electrode 120 includes active materials 126 into which lithium can be inserted, inert materials 128, electrolyte 130 and a current collector 132.

The negative electrode 120 may be provided in various alternative forms. The negative electrode 120 may incorporate dense Li metal or a conventional porous composite electrode (e.g., graphite particles mixed with binder). Incorporation of Li metal is desired since the Li metal affords a higher specific energy than graphite.

The separator region 124 includes an electrolyte with a lithium cation and serves as a physical and electrical barrier between the negative electrode 120 and the positive electrode 122 so that the electrodes are not electronically connected within the battery cell $114_1$ while allowing transfer of lithium ions between the negative electrode 120 and the positive electrode 122.

The positive electrode 122 includes active material 136 into which lithium can be inserted, inert material 138, the electrolyte 130, and a current collector 140. The active material 136 in one embodiment includes a form of sulfur and may be entirely sulfur. A voltage meter 142 is configured to obtain the voltage between the anode 120 and the cathode 122, and a coulomb counter 144 is provided to detect current flow into and out of the battery cell $114_1$. The coulomb counter 144, which in various embodiments may be located anywhere along the circuit 118 or adjacent to the cell module $102_1$, may be used to detect current flow into and out of all of the battery cells $114_{1-5}$ in the cell module $102_1$ since the same current will be flowing through each of the battery cells $114_{1-5}$ connected to the circuit 118.

The lithium-ion battery cells $114_x$ operate in a manner similar to the lithium-ion battery cell disclosed in U.S. patent application Ser. No. 11/477,404, filed on Jun. 28, 2006, the contents of which are herein incorporated in their entirety by reference. In general, with reference to battery cell $114_1$, electrons are generated at the negative electrode 120 during discharging and an equal amount of electrons are consumed at the positive electrode 122 as lithium and electrons move in the direction of the arrow 146 of FIG. 7.

In the ideal discharging of the cell $114_1$, the electrons are generated at the negative electrode 120 because there is extraction via oxidation of lithium ions from the active material 126 of the negative electrode 120, and the electrons are consumed at the positive electrode 122 because there is reduction of lithium ions into the active material 136 of the positive electrode 122. During discharging, the reactions are reversed, with lithium and electrons moving in the direction of the arrow 148.

The cell $114_1$ differs from the cells disclosed in U.S. patent application Ser. No. 11/477,404 in that the cell $114_1$ is switchably connected to a zener circuit 150. The zener circuit 150 includes a resistor 152 with a first end electrically switchably connected to the current collector 140 through a switch 154. The second end of the resistor 152 is electrically connected to a resistor 156 which is in turn electrically connected to the current collector 132.

The second end of the resistor 152 is also electrically connected to a base 158 of a transistor 160. A collector 162 of the transistor 160 is electrically connected to a first end of a zener diode 164. A second end of the zener diode 164 is electrically connected to the first end of the resistor 152 and is thus electrically switchably connected to the current collector 140 through the switch 154. An emitter 166 of the transistor 160 is electrically connected to a resistor 168 which is in turn connected to the current collector 132. A terminal 170 is connected to the zener circuit 150 between the emitter 166 and the resistor 168 while a second terminal 172 is connected to the zener circuit 150 between the resistors 168/156 and the current collector 132.

The switch 154, which in this embodiment is controlled by the processor 110, is switchable between a first position (depicted in FIG. 7) wherein the switch $116_1$ is electrically connected to the collector 140 while the zener circuit 150 is electrically isolated from the collector 140 and the switch $116_1$, and a second position wherein the switch $116_1$ is not directly electrically connected to the collector 140 while the zener circuit 150 is electrically connected to the collector 140 and the switch $116_1$. More specifically, in the position shown in FIG. 7, the terminal 170 is not electrically connected to the switch $116_1$ and the first end of the resistor 152 and the second end of the zener diode 164 are not electrically connected to the collector 140. When the position of the switch 154 is placed in a second position, the zener circuit 150 is switched in with the terminal 170 electrically connected to the switch $116_1$ and the first end of the resistor 152 and the second end of the zener diode 164 electrically connected to the collector 140.

Returning to FIG. 5, the electrochemical battery cell modules $102_{1-5}$ may be used to selectively power the load/source 104 during normal discharge operations by selectively controlling the switches $106_{1-5}$ shut. Similarly, the electrochemical battery cell modules $102_{1-5}$ may be selectively recharged by the load/source 104 during normal charging operations by selectively controlling the switches $106_{1-5}$ shut. Charging and discharging of the lithium-ion battery cells $114_x$ within the cell modules $102_x$ connected to the load 104 can further be selectively controlled by selectively controlling the associated connection switch $116_x$.

Figure 8:
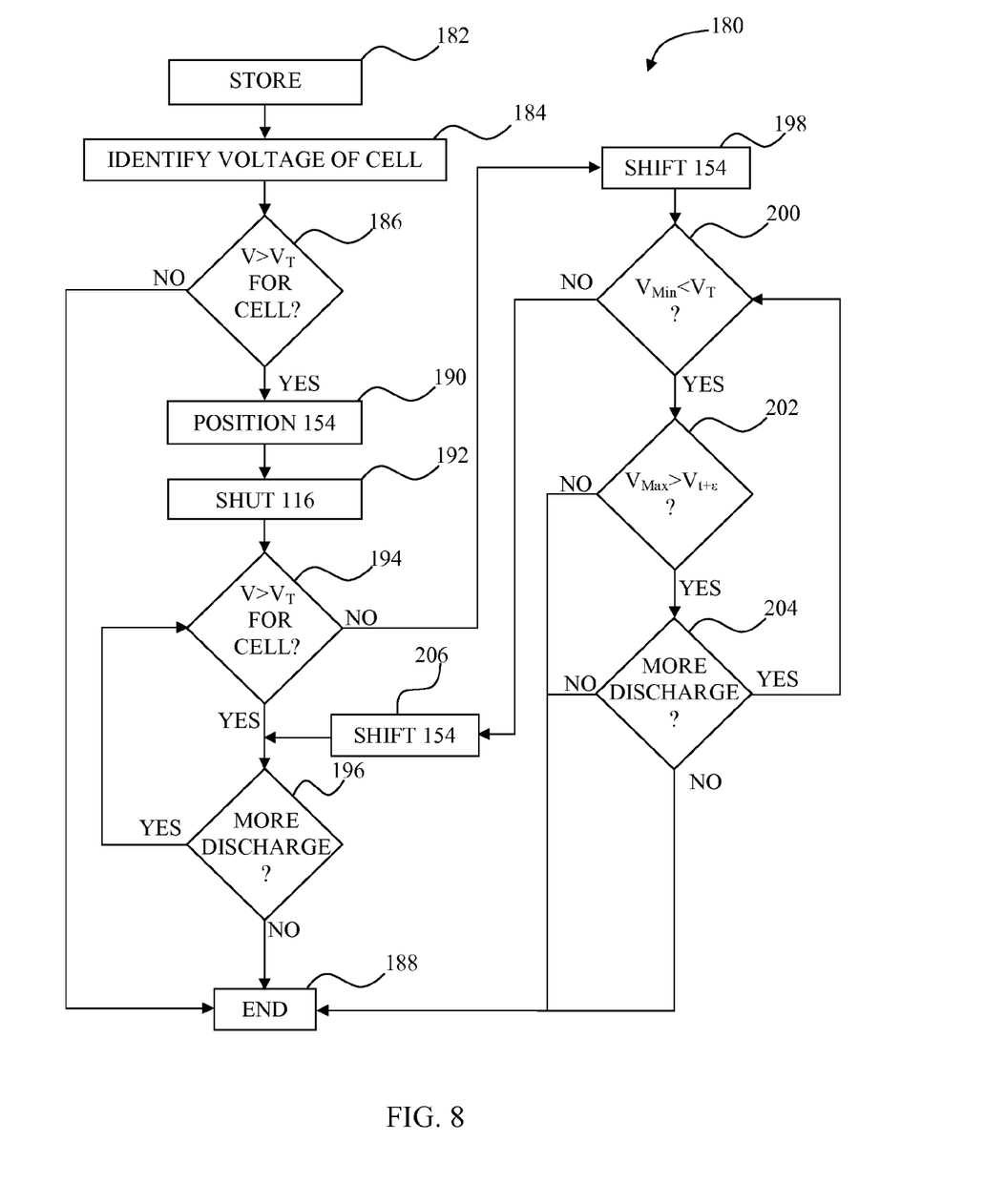
FIG. 8 depicts a flow diagram of a procedure that may be performed by the battery system of FIG. 1 to more fully discharge a selected electrochemical cell without allowing discharge voltage of the electrochemical cell to fall below a predetermined threshold.

In one embodiment, the processor 110 executes command instructions stored within the memory 112 in accordance with a procedure 180 of FIG. 8 to selectively discharge the electrochemical cells $114_x$. Initially, criteria for operating the system 100 are stored in the memory 112 at block 182. The criteria may be in the form of an algorithm with different weights provided for different factors. By way of example, the time since a cell was last fully discharged may be given a first weight and the last known cell capacity may be given another weight. Thus, while two cells may have last been fully discharged at the same time, the cell with a lower capacity may receive a higher score using the stored algorithm. Since a "fully discharged" cell typically has some capacity remaining, the definition of "fully discharged" may vary from one system to another depending upon the cell chemistry, the application, and other criteria.

The system 100 is then operated with the processor 110 controlling the position of the switches $106_{1-5}$ and the connection switches $116_x$. Before the connection switch $116_x$ associated with one of the electrochemical cells $114_x$ is shut when a load 104 is powered by the battery system 100, the processor 110 obtains data from the voltage meter 142 at block 184 indicative of the voltage of the electrochemical cell $114_x$. At block 186, the voltage of the electrochemical cell $114_x$ is compared to a stored threshold voltage. The stored voltage threshold may be selected to ensure that the electrochemical cells $114_x$ does not undergo cell reversal as a result of over discharge.

If the voltage of the electrochemical cell $114_x$ is at or below the threshold voltage at block 186, then the electrochemical cell $114_x$ does not have sufficient capacity to provide power to the load 104 in accordance with the criteria stored at block 182. Accordingly, the connection switch $116_x$ associated with the electrochemical cell $114_x$ is not shut and the process with respect to the electrochemical cell $114_x$ ends at block 188.

If the voltage of the electrochemical cell $114_x$ is above the threshold voltage at block 186, then the electrochemical cell $114_x$ has some capacity to provide power to the load 104. Accordingly, at block 190 the switch 154 is controlled to the position depicted in FIG. 7 with the switch $116_x$ electrically connected to the collector 140 while the zener circuit 150 is isolated from the collector 140 and the switch $116_x$. The switch $116_x$ is then controlled to a closed position (block 192) and the electrochemical cell $114_x$ begins to supply power to the load 104.

As the electrochemical cell $114_x$ provides power to the load 104, the capacity of the electrochemical cell $114_x$ is depleted and the voltage of the electrochemical cell $114_x$ exhibits a voltage profile similar to one of the voltage profiles 10, 12, 14, 16, or 18 of FIG. 1. For purpose of describing the procedure 180, the electrochemical cell $114_x$ is deemed to follow the profiles depicted in FIGS. 2-4.

Continuing with the procedure 180, as the electrochemical cell 114$_x$ discharges, the processor 110 obtains additional voltage data from the voltage meter 142 and compares the obtained voltage to the voltage threshold at block 194. If the obtained voltage is greater than the voltage threshold 46, then the procedure 180 continues to block 196 and the controller determines if additional discharge of the electrochemical cell 114$_x$ is needed.

If at block 196 further discharge is not needed, such as due to termination of power to the load 104 or because current provided by other electrochemical cells 114$_x$ is sufficient for the power demands of the load 104, then the discharge cycle ends at block 188. The actions controlled by the processor 110 for block 188 will vary depending upon the particular circumstances. Thus, termination of the procedure 180 for a particular cell may result in one or more of opening the associated switch 116$_x$, and opening the associated switch 106$_x$.

If at block 196 additional discharge of the electrochemical cell 114$_x$ is desired, then the process returns to block 194. Because the discharge voltage profile 30 exhibits an initial sharp decrease (see FIG. 2), the voltage of the electrochemical cell 114$_x$ may dip below the voltage threshold 46. If at block 194 the voltage of the electrochemical cell 114$_x$ is less than the threshold voltage 46, then the procedure 180 continues at the block 198 and the switch 154 is shifted. Shifting of the switch 154 removes the direct electrical connection between the switch 116$_1$ and the collector 140 while electrically connecting the zener circuit 150 to the collector 140 and the switch 116$_1$. The zener circuit 150 is thus placed into operation.

In general, the zener circuit 150 operates as follows. When the input voltage to the zener circuit 150 is low (i.e. the voltage between the current collector 132 and the current collector 140 is low), the zener diode 164 does not conduct. Accordingly, the electrochemical cell 144$_x$ is prevented from discharging.

As the input voltage to the zener circuit 150 increases above a set point established by the resistors 152 and 156, the zener diode 164 is biased into conduction and the zener diode 164 forward biases the base 158 to emitter 166 junction of the transistor 160. Accordingly, current flows through the transistor 160 and the electrochemical cell 144$_x$ is allowed to provide power to the load 104. The voltage set point of the zener circuit 150 is thus selected to be complementary to the voltage threshold used at block 194. The voltage set point of the zener circuit 150 may thus be substantially equal to the voltage threshold used at block 194. The exact sequence of operation for a particular discharge cycle once the zener circuit 150 is switched in depends upon the initial condition of the electrochemical cell 114$_x$ as explained more fully below with respect to the remaining blocks of the procedure 180.

When the zener circuit 150 is initially switched in at block 198, a comparison is made between the minimum voltage of the electrochemical cell 114$_x$ and a predetermined voltage threshold at block 200. Specifically, when the zener circuit 150 is switched in at block 198, the zener circuit 150 is allowed to operate for a short period of time. During this time, the electrochemical cell 114$_x$ is alternately placed into a discharge condition and a non-discharge condition by the zener circuit 150.

Discharge/non-discharge switching of the zener circuit 150 occurs because the electrochemical cell 114$_x$ is being operated at a condition that corresponds to the position of the discharge voltage profile 30 that is below the voltage threshold 46. Thus, assuming that at time "0" the initial input voltage to the zener circuit 150 is at a voltage less than the voltage set point of the zener circuit 150, the zener diode 164 does not conduct. Accordingly, the electrochemical cell 114$_x$ is prevented from discharging. The voltage of the electrochemical cell 114$_x$ thus rebounds at time "T=1" from a voltage below the threshold 46 toward the corresponding voltage of the open cell voltage profile 36 of FIG. 2.

The open cell voltage profile 36 of FIG. 2, however, is above the voltage threshold 46, which in this embodiment corresponds to the voltage set point of the zener circuit 150. Thus, the electrochemical cell 144$_x$ voltage rebounds above the voltage set point for the zener circuit 150 at time "T=2" and the zener diode 164 is biased into conduction. The electrochemical cell 144$_x$ is thus allowed to provide power to the load 104.

Placing the electrochemical cell 144$_x$ into discharge, however, drives the discharge voltage of the electrochemical cell 144$_x$ toward the voltage of the discharge voltage profile 30 of FIG. 2 at time "T=3". As the electrochemical cell 144$_x$ goes below the voltage set point of the zener circuit 150 (threshold voltage 46) at time "T=4", the electrochemical cell 144$_x$ is again taken out of discharge. The processor 110 thus establishes a discharge voltage of the electrochemical cell 144$_x$ at the set point voltage of the zener circuit 150.

Over several cycles of the zener circuit 150, the minimum voltage detected by the voltage meter 142 and the maximum voltage detected by the voltage detector 142 are captured. Then, returning to the procedure 180 at block 200, the minimum captured voltage is compared to the voltage threshold of block 200, which may be the same voltage threshold of block 194. If the minimum captured voltage is less than the voltage threshold of block 200, the process continues to block 202.

At block 202, the processor determines whether the maximum voltage detected by the voltage detector 142 is greater than a voltage threshold that is generally selected to be greater than the threshold voltage of block 194. The specific value will depend upon the design requirements for the particular implementation. For example, in one embodiment a value substantially equal to the threshold of block 194 may be selected to maximize the discharge of the electrochemical cell 114$_x$. Alternatively, a value slightly higher than the threshold of block 194 may be selected.

If the maximum voltage detected by the voltage detector 142 is not higher than the threshold of block 202, then the electrochemical cell 114$_x$ has fully discharged and the procedure 180 continues at block 188. If the maximum voltage detected by the voltage detector 142 is higher than the threshold of block 202, then the electrochemical cell 114$_x$ has not fully discharged and the procedure 180 continues at block 204.

The results of blocks 200 and 202 thus provide insight as to whether the discharge voltage is lower than the voltage threshold of block 194 due to an initial rapid increase in internal resistance or because capacity of the electrochemical cell 114$_x$ has actually been depleted, i.e., at the extreme right portion of the discharge voltage profile 30 of FIG. 2, or along the discharge voltage profile 18 of FIG. 1.

In embodiments incorporating a voltage detector or zener circuit components that do not provide sufficient granularity to distinguish between the minimum voltage and the maximum voltage while the zener circuit 150 is switching between discharge and non-discharge conditions, other criteria may be used to distinguish actual electrochemical cell 114$_x$ capacity depletion and apparent depletion. For example, periodic cell characterization such as characterizations described in U.S. Pat. No. 7,676,334, issued on Mar. 9, 2010 may be used to establish a discharge voltage profile for an electrochemical cell. Thus, one or more estimated cell conditions may be used to control the discharge of the electrochemical cell $114_x$ in accordance with the procedure 180 rather than actual measured conditions.

At block 204, if no further discharge of the electrochemical cell $114_x$ is needed, then the process continues to block 188 and ends. If additional discharge of the electrochemical cell $114_x$ is needed, the procedure 180 continues at block 200.

At block 200, the minimum voltage of the electrochemical cell $114_x$ is again compared to the threshold of block 194. In the event that the electrochemical cell $114_x$ has increased in temperature such that the internal resistance has decreased, the minimum voltage of the electrochemical cell $114_x$ will begin to increase.

Specifically, as the zener diode circuit 150 is switching between discharge and non-discharge states, the temperature of the electrochemical cell $114_x$ continues to increase due to the power dissipated within the electrochemical cell $114_x$. Additionally, the zener circuit 150 may be positioned such that the electrochemical cell $114_x$ acts as a heat sink for the zener circuit 150. Thus, operation of the zener circuit 150 contributes to increasing the temperature of the electrochemical cell $114_x$. Because the temperature of the electrochemical cell $114_x$ is increased, the internal resistance of the electrochemical cell $114_x$ initially increases rapidly followed by a rapid decrease as shown in FIG. 3.

As the internal resistance of the electrochemical cell $114_x$ decreases, the minimum potential discharge voltage increases as indicated by the discharge voltage profile 46 to the right of the point 38 of FIG. 2. Once the minimum voltage of the electrochemical cell $114_x$ increases above the voltage threshold of block 194, then the procedure 180 continues at block 206. At block 206, the switch 154 is repositioned to the configuration of FIG. 7 and discharge of the electrochemical cell $114_x$ continues as needed at block 196 with the discharge voltage of the electrochemical cell $114_x$ permitted to follow the discharge voltage profile 30.

The procedure 180 thus maintains the minimum discharge voltage of a cell above a desired threshold voltage while allowing for continued discharge of the cell. In the event the low discharge voltage of a cell is the result of an elevated internal resistance which subsequently decreases, the procedure 180 allows for the discharge voltage of the cell to revert to the normal discharge voltage profile once the internal resistance has decreased to an acceptable level. The procedure 180 may be modified in a number of ways depending upon the desired operation as well as the data available for a given cell.

By way of example, in some embodiments cell temperature data may be obtained by a thermocouple. In such embodiments, the shift of the switch 154 at block 198 may only be performed if the temperature of the cell is determined to be below the threshold temperature, e.g., threshold temperature 44. In such embodiments, the procedure 180 may be further modified to perform the shift of switch 154 at block 206 based upon the detected increase in cell temperature above the threshold temperature 44. If sufficient data about the cell is known, the procedure 180 may be performed without any direct voltage input based upon the detected temperature.

In some embodiments, the procedure 180 may be further modified to control the discharge voltage of a cell based solely upon cell characterization data and discharge time. Thus, discharge voltage control may be initiated at a time corresponding to when the cell is estimated to be at the point 48 and terminated at a time corresponding to the estimated increase in discharge voltage above the voltage threshold 46.

In other embodiments, voltage of the cell may be indirectly sensed to control the discharge voltage of the cell. For example, in a system wherein the current provided by the cell is not maintained at a constant level, as the internal resistance of the cell decreases, the current output of the cell will increase. Accordingly, a current meter may be used to determine when the internal resistance of a cell has decreased sufficiently such that the discharge voltage of the cell is above a desired threshold voltage.

Figure 9:
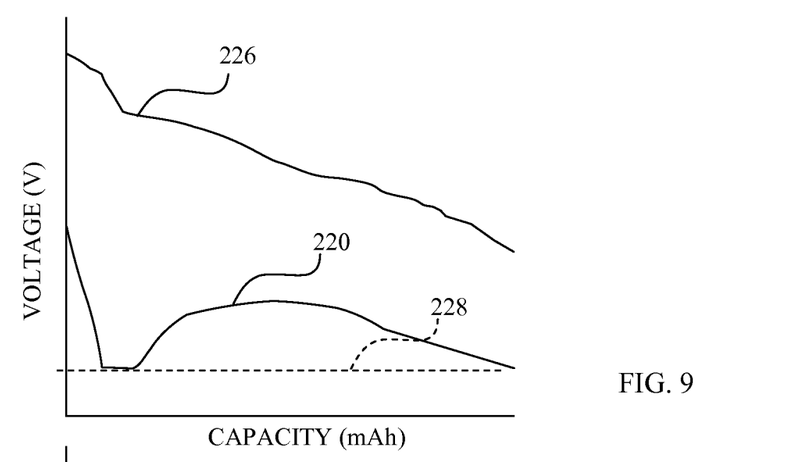
FIG. 9 depicts the open cell voltage profile and discharge voltage profile of an exemplary electrochemical cell during a discharge cycle while maintaining a discharge voltage at a predetermined threshold while allowing the discharge voltage to float above the predetermined threshold.
Figure 10:
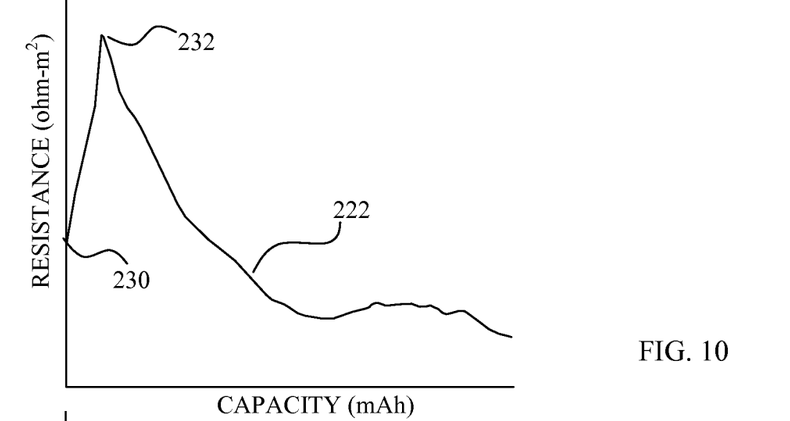
FIG. 10 depicts an internal resistance profile of the electrochemical cell of FIG. 9 during the discharge cycle.
Figure 11:
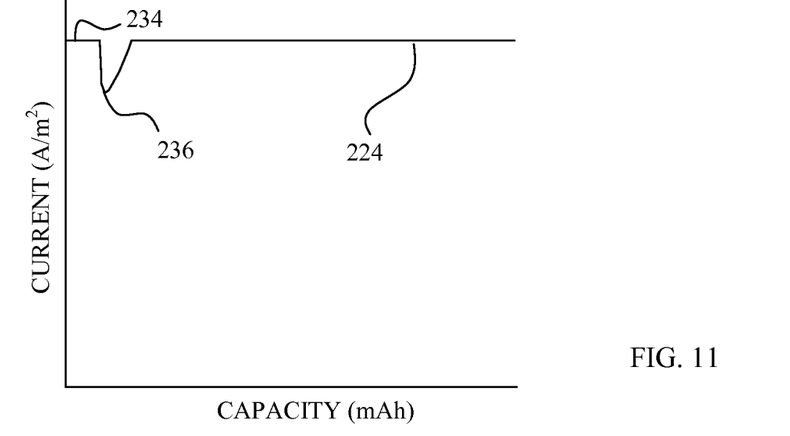
FIG. 11 depicts a current profile of the electrochemical cell of FIG. 9.

By way of example, FIGS. 9-11 depict a voltage profile 220, and internal resistance profile 222, and a discharge current profile 224 for an exemplary electrochemical cell. The open cell voltage profile 226 of the exemplary cell is also depicted in FIG. 9. FIGS. 9-11 depict the results of a modified procedure 180 wherein voltage of the electrochemical cell is maintained at or above a predetermined voltage threshold 228. Thus, so long as the discharge voltage is above the voltage threshold 228, the discharge voltage is not constrained. The discharge voltage profile 222 and the internal resistance profile 224 are thus similar to a discharge voltage profile and internal resistance profile that would be obtained if the exemplary electrochemical cell were controlled in the manner described above with respect to the procedure 180.

In FIGS. 9-11, however, the discharge current is not constant. Rather, the discharge current is allowed to vary in response to changes in the internal resistance. Accordingly, as the internal resistance increases from point 230 to point 232, the discharge current drops rapidly from an initial rate at point 234 to a minimum at point 236. In systems requiring a constant output current, the reduced current may be supplanted with current from another electrochemical cell.

Once the internal resistance of the exemplary cell begins to decrease after the point 232, the discharge current of the exemplary cell begins to increase as indicated by the discharge current profile 224 to the right of point 236. Once the discharge current has increased to a predetermined level, such as the current level at point 234, the discharge voltage of the exemplary cell is allowed to float above the voltage threshold 228. The unconstrained discharge voltage thus follows a typical discharge profile. Any supplemented current would be reduced commensurate with the increased current from the exemplary cell.

Thus, in the system of FIGS. 9-11, a current sensor may be used to sense the output current of the exemplary cell. The procedure 180 may therefore be modified to initiate discharge voltage control when a first sensed current drops below a first threshold based upon a predetermined minimum discharge voltage, and to permit unconstrained discharge voltage when the sensed discharge current exceeds another threshold.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical battery system, comprising:
a first electrochemical cell;
a memory in which command instructions are stored; and
a processor configured to execute the command instructions during a discharge cycle of the first electrochemical cell to (i) establish a first voltage threshold of the first electrochemical cell, (ii) establish a second voltage threshold based upon a first sensed voltage of the first electrochemical cell meeting the first voltage threshold during the discharge cycle, and (iii) permit a subsequent discharge of the first electrochemical cell during the discharge cycle based upon a voltage of the first electrochemical cell meeting the second voltage threshold, such that discharging of the first electrochemical cell is paused when the first sensed voltage meets the first voltage threshold, and such that discharging of the first electrical chemical cell is subsequently allowed during the discharge cycle when the first electrochemical cell voltage rises above the second voltage threshold.

2. The electrochemical battery system of claim 1, wherein: the processor is further configured to execute the command instructions during the discharge cycle to establish the first voltage threshold based upon a first temperature.

3. The electrochemical battery system of claim 2, wherein: the processor is configured to execute the command instructions to establish the second voltage threshold based upon a second temperature; and
the second temperature is greater than the first temperature.

4. The electrochemical battery system of claim 2, further comprising:
a temperature detector configured to sense a temperature associated with the first electrochemical cell, wherein:
the processor is operably connected to the temperature detector and is further configured to execute the command instructions to establish the first voltage threshold based upon a first sensed temperature associated with the first electrochemical cell.

5. The electrochemical battery system of claim 4, wherein: the processor is further configured to execute the command instructions to establish the second voltage threshold based upon a second sensed temperature associated with the first electrochemical cell.

6. The electrochemical battery system of claim 1, further comprising:
a current detector configured to sense a discharge current of the first electrochemical cell, wherein:
the processor is operably connected to the current detector and is further configured to execute the command instructions to establish a discharge voltage based upon the sensed discharge current.

7. The electrochemical battery system of claim 6, further comprising:
a temperature detector configured to sense a temperature associated with the first electrochemical cell, wherein:
the processor is operably connected to the temperature detector and is further configured to execute the command instructions to establish the first voltage threshold based upon a first sensed temperature associated with the first electrochemical cell.

8. The electrochemical battery system of claim 7, wherein: the processor is further configured to execute the command instructions to establish the second voltage threshold based upon a second sensed temperature associated with the first electrochemical cell.

9. The electrochemical battery system of claim 1, further comprising a second electrochemical cell, wherein the processor is further configured to:
execute the command instructions during the discharge cycle to discharge the second electrochemical cell at a first rate, and (ii) discharge the second electrochemical cell at a second rate after discharging the second electrochemical cell at the first rate and after the voltage of the first electrochemical cell meets the second voltage threshold, wherein the second discharge rate is less than the first discharge rate.

10. The electrochemical battery system of claim 1, further comprising a voltage limiting circuit, wherein the processor is further configured to:
permit the subsequent discharge by switching the voltage limiting circuit into the electrochemical battery cell circuit.

11. An electrochemical battery system, comprising:
an electrochemical cell;
a voltage limiting circuit, wherein the voltage limiting circuit is configured to (i) establish a maintained discharge voltage of the electrochemical cell when a first unconstrained discharge voltage of the electrochemical cell falls to a minimum voltage limit during a discharge cycle of the electrochemical cell, and (ii) permit a second unconstrained discharge voltage of the electrochemical cell during the discharge cycle after establishing the first maintained discharge voltage, wherein the second unconstrained discharge voltage is greater than the minimum voltage limit
an electrochemical battery cell circuit;
a switch configured to shift between a first position whereat the voltage limiting circuit is electrically connected to the electrochemical battery cell circuit to establish the maintained discharge voltage, and a second position whereat the voltage limiting circuit is not electrically connected to the electrochemical battery cell circuit to permit the second unconstrained discharge voltage;
a memory in which command instructions are stored; and
a processor configured to execute the command instructions during a discharge cycle of the electrochemical cell to (i) position the switch in the first position based upon the first unconstrained discharge voltage, and (ii) position the switch in the second position after positioning the switch in the first position when the electrochemical cell voltage rises above the minimum voltage limit.

12. The electrochemical battery system of claim 11, wherein:
the processor is further configured to execute the command instructions during the discharge cycle of the electrochemical cell to position the switch in the first position based upon a first temperature.

13. The electrochemical battery system of claim 12, wherein:
the processor is configured to execute the command instructions to position the switch in the second position based upon a second temperature; and
the second temperature is greater than the first temperature.

14. The electrochemical battery system of claim 12, further comprising:
a temperature detector configured to sense a temperature associated with the electrochemical cell, wherein:
the processor is operably connected to the temperature detector and is further configured to execute the command instructions to position the switch in the first position based upon a first sensed temperature associated with the electrochemical cell.

15. The electrochemical battery system of claim 14, wherein:
the processor is further configured to execute the command instructions to position the switch in the second position based upon a second sensed temperature associated with the electrochemical cell.

16. The electrochemical battery system of claim 11, further comprising:
a current detector configured to sense a discharge current of the electrochemical cell, wherein:
the processor is operably connected to the current detector and is further configured to execute the command instructions to position the switch in the second position based upon a sensed discharge current.

17. The electrochemical battery system of claim 16, further comprising:
- a temperature detector configured to sense a temperature associated with the electrochemical cell, wherein:
- the processor is operably connected to the temperature detector and is further configured to execute the command instructions to position the switch in the first position based upon a first sensed temperature associated with the electrochemical cell.

18. The electrochemical battery system of claim 16, wherein:
- the processor is further configured to execute the command instructions to position the switch in the second position based upon a second sensed temperature associated with the electrochemical cell.

* * * * *